(12) United States Patent
Cao

(10) Patent No.: US 10,661,157 B2
(45) Date of Patent: May 26, 2020

(54) METHOD AND SYSTEM INCORPORATING REAL ENVIRONMENT FOR VIRTUALITY AND REALITY COMBINED INTERACTION

(71) Applicant: BEI JING XIAO XIAO NIU CREATIVE TECHNOLOGIES LTD., Beijing (CN)

(72) Inventor: Xiang Cao, Beijing (CN)

( * ) Notice: Subject to any disclaimer, the term of this patent is extended or adjusted under 35 U.S.C. 154(b) by 86 days.

(21) Appl. No.: 15/697,449

(22) Filed: Sep. 7, 2017

(65) Prior Publication Data

US 2017/0361216 A1 Dec. 21, 2017

Related U.S. Application Data

(63) Continuation of application No. PCT/CN2016/075591, filed on Mar. 4, 2016.

(30) Foreign Application Priority Data

Mar. 26, 2015 (CN) .......................... 2015 1 0137631

(51) Int. Cl.
*A63F 13/21* (2014.01)
*A63F 13/428* (2014.01)
*A63F 13/655* (2014.01)
*A63F 13/42* (2014.01)
*A63F 13/213* (2014.01)
*A63F 13/52* (2014.01)
*G06T 19/00* (2011.01)

(52) U.S. Cl.
CPC ............ *A63F 13/21* (2014.09); *A63F 13/213* (2014.09); *A63F 13/42* (2014.09); *A63F 13/428* (2014.09); *A63F 13/52* (2014.09); *A63F 13/655* (2014.09); *G06T 19/006* (2013.01)

(58) Field of Classification Search
None
See application file for complete search history.

(56) References Cited

U.S. PATENT DOCUMENTS

2010/0167820 A1 * 7/2010 Barakat .................. A63F 13/06
463/37
2012/0306924 A1 12/2012 Willoughby et al.
2018/0322706 A1 * 11/2018 Drouin .................. G06T 19/006

FOREIGN PATENT DOCUMENTS

CN 102974100 A 3/2013
CN 104740869 A 7/2015
KR 20140043522 A 4/2014

* cited by examiner

*Primary Examiner* — Ronald Laneau
(74) *Attorney, Agent, or Firm* — Erson IP (Nelson IP)

(57) ABSTRACT

A method incorporating real environment for virtuality and reality combined interaction includes: step 1: capturing a frame of image in a real environment, and determining a movement state between a previous frame of image and a current image for at least one edge point in the image; step 2: for each of virtual objects in the virtual content, detecting whether the edge point is existed on the periphery of the virtual object, and applying corresponding function on the virtual object according to the movement state of the edge point when the edge point is existed on the periphery of the virtual object; and step 3: displaying the virtual content and the real environment in a superimposed manner according to function effect of the edge point to the virtual object, and returning back to step 1 to proceed until interaction between virtuality and reality is end.

16 Claims, 5 Drawing Sheets

Capturing a frame of image in a real environment, and determining a movement state between a previous frame of image and a current image for at least one edge point in the image — step1

Detecting, for each of virtual objects in the virtual content, whether the edge point is existed on the periphery of the virtual object, and applying corresponding function on the virtual object according to the movement state of the edge point when the edge point is existed on the periphery of the virtual object — step2

Displaying the virtual content and the real environment in a superimposed manner according to function effect of the edge point to the virtual object, and returning back to step 1 to proceed until interaction between virtuality and reality is end — step3

METHOD AND SYSTEM INCORPORATING REAL ENVIRONMENT FOR VIRTUALITY AND REALITY COMBINED INTERACTION

CROSS-REFERENCE TO RELATED APPLICATIONS

This application is a continuation of International Patent Application No. PCT/CN20161075591 with a filing date of Mar. 4, 2016, designating the United States, now pending, and further claims priority to Chinese Patent Application No. 201510137631,2 with a filing date of Mar. 26, 2015. The content of the aforementioned applications, including any intervening amendments thereto, are incorporated herein by reference.

TECHNICAL FIELD

The present disclosure relates to the field of human-computer interaction, and in particular, to a method and system incorporating real environment for virtuality and reality combined interaction.

BACKGROUND OF THE PRESENT INVENTION

Electronic games are presented as recreation in various electronic apparatuses, such as computer, cellphone, and game console etc., in which game applications can be installed. For current electronic games, an interaction is inducted between a game player (i.e., game user) and virtual content of the game displayed in an electronic apparatus mainly by manipulating such input devices of the electronic apparatus as touchscreen, gamepad, mouse and keyboard etc., and the virtual content includes but not limited to scene, person and prop and so forth. The game experience using this interaction manner is completely limited to the virtual content of the game in the electronic apparatus, and is in no relation with the surrounding real environment.

In recent years, in order to break this limitation, a robe for games combining virtuality and reality is conducted to attempt to introduce a real environment and body movements into the game to promote game experience. Such games include motion sensing games and augmented reality games.

The motion sensing games are famous for Kinect related games in Xbox playstation developed by Microsoft, and the virtual characters in the games are controlled by tracking the player's body movements of his whole body or half body via a depth camera or other sensing device and corresponding algorithm. Real movements of the player replace the ordinary game input device in such games, but the content displayed in the game is still the virtual content of the game, and thus is not areal experience combining virtuality and reality.

Augmented reality games achieve an effect of combining virtuality and reality by displaying the virtual content of the games in a real environment in an superimposed manner. The superimposed display can be achieved by projection on the real environment directly, by superimposing the virtual content in a position between human eyes and the real environment via a perspective head-mounted display (smart glasses), or by displaying via an ordinary display the real environment captured by the camera and the virtual content simultaneously to achieve an effect of indirect superimposition. Wherein, the previous two manners are in a stage of study due to requirement of special apparatus, and the last manner has been used in actual games of phones due to its low requirement for apparatus.

For a simple augmented reality game, the real environment is not analysis, and the real environment as merely background of the game is not used to interact with the virtual content of the game. For a relative higher augmented reality game, some preset signs such as two dimensional code and specific images etc., will be identified and tracked in real time, and these signs will be aligned to display in two dimensional or three dimensional space with the virtual content, so as to enhance the experience of combining virtuality and reality. However, the real environment except these signs as merely background of display will play no role for interaction of game. Thus, "combination of virtuality and reality" in current augmented reality games is substantially limited to visual effect, and the interaction mechanism of these games is not different from that of traditional "pure virtual" games in nature. That is to say, the current motion sensing games and augmented reality games do not achieve a real game interaction mechanism and experience combining virtuality and reality.

SUMMARY OF PRESENT INVENTION

A method and system incorporating real environment for virtuality and reality combined interaction are provided to solve the technical problem in prior art that motion sensing games and augmented reality technique do not achieve a real interaction mechanism and experience which combine virtuality and reality.

To solve the above technical problem, embodiments of the disclosure provide a method incorporating real environment for virtuality and reality combined interaction, including:

step 1: capturing a frame of image in a real environment, and determining a movement state between a previous frame of image and a current image for at least one edge point in the image;

step 2: for each of virtual objects in the virtual content, detecting whether the edge point is existed on the periphery of the virtual object, and applying corresponding function on the virtual object according to the movement state of the edge point when the edge point is existed on the periphery of the virtual object; and step 3: displaying the virtual content and the real environment in a superimposed manner according to function effect of the edge point to the virtual object, and returning back to step 1 to proceed until interaction between virtuality and reality is end.

Alternatively, the capturing a frame of image in a real environment, and determining a movement state between a previous frame of image and a current image for at least one edge point in the image comprises:

capturing a frame of image in a real environment via a camera device;

performing edge detection for the image to determine edge points of the image, the edge points corresponding to contour of objects in the real environment;

determining, in combination of a previous frame of captured image, a movement state between a previous frame of image and a current image for each of the detected edge points.

Alternatively, the performing edge detection for the e to determine edge points of the image comprises:

performing a division for the captured image according to at leas one preset attribute to extract a picture corresponding to the preset attribute, the preset attribute comprising objects in the real environment specified for interacting with the virtual content and/or movement state of the objects, the objects in the real environment comprising living things and non-living things in the nature; and performing edge detection for the extracted picture'to determine edge points of the image.

Alternatively, the determining, in combination of a previous frame of captured image, a movement state between a previous frame of image arid a current image for each of the detected edge points comprises:

for each of the detected edge points, determining, in combination of a previous frame of captured image, a movement state between a previous frame of image and a current image of a point of an object in the real environment corresponding to the edge point.

Alternatively, for each of virtual objects in the virtual content, the detecting whether the edge point is existed on the periphery of the virtual object, and applying corresponding function on the virtual object according to the movement state of the edge point when the edge point is existed on the periphery of the virtual object comprises:

detecting, for each of virtual objects in the virtual content, whether the edge point is existed on the periphery of the virtual object, according to a display manner of superimposition; and when the edge point is existed on the periphery of the virtual object, simulating real physical law based on the movement status of the edge point, and applying, in combination of the state of the virtual object, a movement state of an object in the real environment corresponding to the edge point to the virtual object and create corresponding function effect, the state of the virtual object comprising virtual attribute set for the virtual object in virtual content.

Alternatively, the applying a movement state of an object in the real environment corresponding to the edge point to the virtual object and creating corresponding function effect comprises:

applying, in a physical manner, a movement state of an object in the real environment corresponding to the edge point to the virtual object and create corresponding function effect; or applying, in a physical-beyond manner, a movement state of an object in the real environment corresponding to the edge point to the virtual object and create corresponding function effect;

the applying, in a physical manner, a movement state of an object in the real environment corresponding to the edge point to the virtual object and creating corresponding function effect comprises:

crashing and impacting the virtual object using an object in the real environment via simulating real physical law, or helping the virtual object pass obstacles by using an object in the real environment as attack tool, defense tool or guide tool; or moving the virtual object in the scene set by a player, and interacting with the scene set by the player and the player;

the applying, in a physical-beyond manner, a movement state of an object in the real environment corresponding to the edge point to the virtual object and creating corresponding function effect comprises: twisting, shortening the virtual object by using an object in the real environment.

Alternatively, the applying corresponding function on the virtual object according to the movement state of the edge point comprises:

when the edge point is existed on the periphery of the virtual object, applying, based on the movement status of the edge point and preset rules in the virtual content, and in combination of the state of the virtual object, a movement state of an object in the real environment corresponding to the edge point to the virtual object and create corresponding function effect.

Alternatively, the displaying the virtual content and the real environment in a superimposed manner according to function effect of the edge point to the virtual object comprises:

superimposing and completely displaying the virtual content and the real environment according to function effect of the edge point to the virtual object; or superimposing and displaying the virtual content and some areas of he real environment according to preset attributes in the virtual content; or displaying the real environment merely on some areas of the screen or virtual scene according to preset attributes in the virtual content.

In another aspect, embodiments of the disclosure provide a system incorporating real environment for virtuality and reality combined interaction, including:

a movement determining unit for edge point, configured to capture a frame of image in a real environment, and determine a movement state between a previous frame of image and a current image for at least one edge point in the image;

a functioning unit, configured to detect, for each of virtual objects in the virtual content, whether the edge point is existed on the periphery of the virtual object, and apply corresponding function on the virtual object according to the movement state of the edge point when the edge point is existed on the periphery of the virtual object; and a display unit, configured to display the virtual content and the real environment in a superimposed manner according to function effect of the edge point to the virtual object, and return back to the movement determining unit for edge point to proceed until interaction between virtuality and reality is end.

Alternatively, the movement determining unit for edge point comprises:

capturing module, configured to capture a frame of image in a real environment via a camera device;

detecting module, configured to perform edge detection for the image to determine edge points of the image, the edge points corresponding to contour of objects in the real environment;

movement determining module for edge point, configured to determine in combination of a previous frame of captured image, a movement state between a previous frame of image and a current image for each of the detected edge points.

Alternatively, the detecting module comprises:

a division sub-module, configured to perform a division for the captured image according to at least one preset attribute to extract a picture corresponding to the preset attribute, the preset attribute comprising objects in the real environment specified for interacting with the virtual content and/or movement state of the objects, the objects in the real environment comprising living things and non-living things in the nature; and a detecting sub-module, configured to perform edge detection for the extracted picture to determine edge points of the image.

Alternatively, the movement determining module for edge point is further configured to:

determine, for each of the detected edge points, in, combination of a previous frame of captured image, a movement state between a previous frame of image and a current image of a point of an object in the real environment corresponding to the edge point.

Alternatively, the functioning unit comprises:

an edge point determining module, configured to detect, for each of virtual objects in the virtual content, whether the edge point is existed on the periphery of the virtual object, according to a display manner of superimposition; and a first functioning module, configured to, simulate, when the edge point is existed on the periphery of the virtual object, real physical law based on the movement status of the edge point, and apply, in combination of the state of the virtual object, a movement state of an object in the real environment corresponding to the edge point to the virtual object and create corresponding function effect, the state of the virtual object comprising virtual attribute set for the virtual object in virtual content.

Alternatively, the first functioning module comprise a first functioning sub-module, configured to apply, in a physical manner, a movement state of an object in the real environment corresponding to the edge point to the virtual object and create corresponding function effect; or a second functioning sub-module, configured to apply, in a physical-beyond manner, a movement state of an object in the real environment corresponding to the edge point to the virtual object and create corresponding function effect:

the first functioning sub-module is further configured to:

crash and impact the virtual object using an object in the real environment via simulating real physical law; or help the virtual object pass obstacles by using an object in the real environment as attack tool, defense tool or guide tool; or move the virtual object in the scene set by a player, and interacting with the scene set by the player and the player;

the second functioning sub-module is further configured to: twist, shorten the virtual object using an object in the real environment.

Alternatively, the functioning unit further comprises:

a second functioning module, configured to apply, when the edge point is existed on the periphery of the virtual object, based on the movement status of the edge point and preset rules in the virtual content, and in combination of the state of the virtual object, a movement state of an object in the real environment corresponding to the edge point to the virtual object and create corresponding function effect.

Alternatively, the display unit comprises:

a first display module, configured to superimpose and completely display the virtual content and the real environment according to function effect of the edge point to the virtual object; or a second display module, configured to superimpose and display the virtual content and some areas of the real environment according to preset attributes in the virtual content; or a third display module, configured to display the real environment merely on some areas of the screen or virtual scene according to preset attributes in the virtual content.

The above technical schemes provide the following technical benefits:

In the above schemes, by means of capturing frame images repeatedly in a real environment, determining a movement state between a previous frame of image and a current image for at least one edge point in the image, applying corresponding function on the virtual object of the virtual content according to the movement state of the edge point, and finally displaying the virtual content and the real environment in a superimposed manner according to function effect of the edge point to the virtual object, any object in the real environment can apply corresponding function on the virtual object to achieve a real interaction mechanism and experience combining virtuality and reality. Different from, some prior augmented reality technique that requires identifying and tracking particular signs, the present disclosure has no need for priori knowledge of objects in the real environment.

DETAILED DESCRIPTION OF PREFERRED EMBODIMENTS

To make the objectives, technical solutions, and advantages of the present disclosure clearer, embodiments of the present disclosure are described in detail below with reference to the accompanying drawings.

For the problem in prior art that motion sensing games and augmented reality technique do not achieve a real interaction mechanism and experience which combine virtuality and reality, a method and system incorporating real environment for virtuality and reality combined interaction are provided in the disclosure.

Embodiment 1

Figure 1:
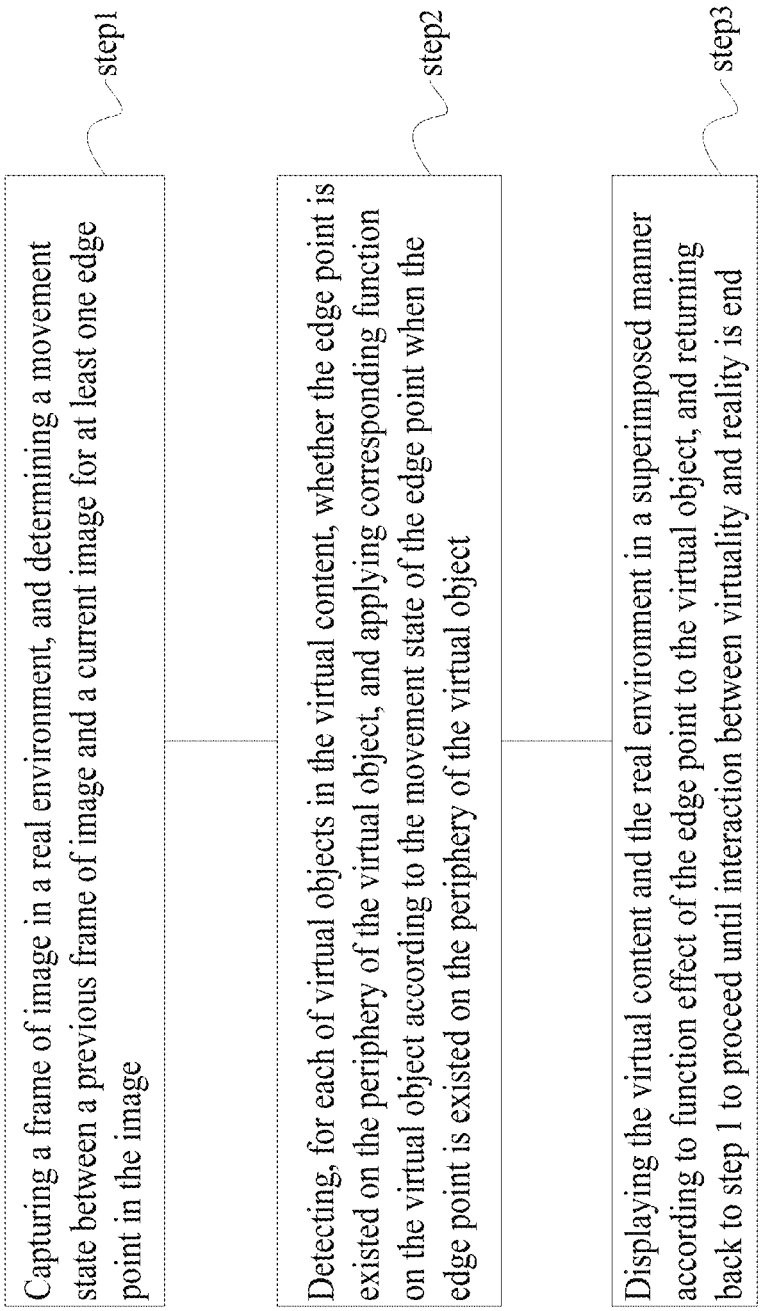
FIG. 1 is a flowchart of a method incorporating real environment for virtuality and reality combined interaction, provided in the embodiments of the present disclosure.

As shown in FIG. 1, an embodiment of the present disclosure provides a method incorporating real environment for virtuality and reality combined interaction, including:

step 1: capturing a frame of image in a real environment, and determining a movement state between a previous frame of image and a current image for at least one edge point in the image;

step 2: for each of virtual objects in the virtual content, detecting whether the edge point is existed on the periphery of the virtual object, and applying corresponding function on the virtual object according to the movement state of the edge point when the edge point is existed on the periphery of the virtual object; and step 3: displaying the virtual content and the real environment in a superimposed manner according to function effect of the edge point to the virtual object, and returning back to step 1 to proceed unto interaction between virtuality and reality is end.

In the method incorporating real environment for virtuality and reality combined interaction, provided in an embodiment of the disclosure, by means of capturing frame images repeatedly in a real environment, determining a movement state between a previous frame of image and a current image for at least one edge point in the image, applying corresponding function on the virtual object of the virtual content according to the movement state of the edge point, and finally displaying the virtual content and the real environment in a superimposed manner according to function effect of the edge point to the virtual object, any object in the real environment can apply corresponding function on the virtual object to achieve a real interaction mechanism and experience combining virtuality and reality. Different from some prior augmented reality technique that requires identifying and tracking particular signs, the present disclosure has no need for priori knowledge of objects in the real environment.

The objects in the real environment mentioned in the embodiments of the disclosure include all of the living things and non-living things in the nature, for example, plants and animals (including senior animal: human) having life and movement state therefor, and tables, chairs, mouse, paintings etc. having no life. Likewise, virtual objects in the virtual content include all of the living things and non-living things in the virtual content. That is to say, the present disclosure can not only apply to interaction scene having augmented reality feature in a game, but also apply to any other interaction scene having augmented reality feature.

In a specific implementation of the above method incorporating real environment for virtuality and reality combined interaction, alternatively, the capturing a frame of image in a real environment, and determining a movement state between a previous frame of image and a current image for at least one edge point in the image comprises:

capturing a frame of image in a real environment via a camera device:

performing edge detection for the image to determine edge points of the image, the edge points corresponding to contour of objects in the real environment;

determining, in combination of a previous frame of captured image, a movement state between a previous frame of image and a current image for each of the detected edge points.

In the embodiments of the disclosure, a frame of image can be captured by a webcam or camera installed in an electronic apparatus (such as, a cellphone, tablet computer, notebook computer, desktop computer and so forth), and edge detection for the captured image can be conducted with an edge detection algorithm, to obtain edge points of the image. The edge points correspond to contour of objects in the real environment.

In a specific implementation of the above method incorporating real environment for virtuality and reality combined interaction, alternatively, the performing edge detection for the image to determine edge points of the image comprises:

performing a division for the captured image according to at least one preset attribute to extract a picture corresponding to the preset attribute, the preset attribute comprising objects in the real environment specified for interacting with the virtual content and/or movement state of the objects, the objects in the real environment comprising living things and non-living things in the nature; and performing edge detection for the extracted picture to determine edge points of the image.

Taking electronic games as an example in the embodiments of the disclosure, at least one attribute can be set to specify those objects or those movement states which can be used to apply function to the virtual object in the virtual content. For example, a set can be made to specify that only body movements of the player can be used to apply function to the virtual content, and the other content in the captured image cannot apply any function to the virtual content. At this time, a division for the captured image can be made to extract a picture corresponding to the body movement of the player, and subsequently edge detection for the extracted picture can be conducted to determine edge points of the image. The edge points correspond to the contour of the player in the real environment.

In a specific implementation of the above method incorporating real environment for virtuality and reality combined interaction, alternatively, the determining, in combination of a previous frame of captured image, a movement state between a previous frame of image and a current image for each of the detected edge points comprises:

for each of the detected edge points, determining, in combination of a previous frame of captured image, a movement state between a previous frame of image and a current image of a point of an object in the real environment corresponding to the edge point.

In the embodiments of the disclosure, for each of the detected edge points, a movement state between a previous frame of image and a current image of the edge point is determined in combination of a previous frame of captured image. The movement state of the edge point includes: whether the edge point is in a state of movement, movement direction and movement velocity for the edge point and so forth. The movement state of the edge point can reflect local movement of an, object in the real environment corresponding to the edge point, and the same object in the real environment can have different movement at different local positions.

In a specific implementation of the above method incorporating real environment for virtuality and reality combined interaction, alternatively, for each of virtual objects in the virtual content, the detecting whether the edge point is existed on the periphery of the virtual object, and applying corresponding function on the virtual object according to the movement state of the edge point when the edge point is existed on the periphery of the virtual object comprises:

detecting, for each of virtual objects in the virtual content, whether the edge point is existed on the periphery of the virtual object, according to a display manner of superimposition; and when the edge point is existed on the periphery of the virtual object, simulating real physical law based on the movement status of the edge point, and applying, in combination of, the state of the virtual object, a movement state of an object in the real environment corresponding to the edge point to the virtual object and create corresponding function effect, the state of the virtual object comprising virtual attribute set for the virtual object in virtual content.

In the embodiments of the present disclosure, for each of virtual objects in the virtual content, a detection is made according to a display manner of superimposition as to whether the edge point is existed on the periphery of the virtual object, when the edge point is existed on the periphery of the virtual object, real physical law is simulated based on the movement status of the edge point, and a movement state of an object in the real environment corresponding to the edge point is applied to the virtual object in combination of the state of the virtual object, and corresponding function effect is created. The state of the virtual object includes virtual attribute set for the virtual object in virtual content, for example, position information, movement direction and movement velocity for the virtual object, and other attribute set for the virtual object in the virtual content.

In a specific implementation of the above method incorporating real environment for virtuality and reality combined interaction, alternatively, the applying a movement state of an object in the real environment corresponding to the edge point to the virtual object and creating corresponding function effect comprises:

applying, in a physical manner, a movement state of an object in the real environment corresponding to the edge point to the virtual object and create corresponding function effect; or applying, in a physical-beyond manner, a movement state of an object in the real environment corresponding to the edge point to the virtual object and create corresponding function effect;

the applying, in a physical manner, a movement state of an object in the real environment corresponding to the edge point to the virtual object and creating corresponding function effect comprises:

crashing and impacting the virtual object using an object in the real environment via simulating real physical law; or helping the virtual object pass obstacles by using an object in the real environment as attack tool, defense tool or guide tool; or moving the virtual object in the scene set by a player, and interacting with the scene set by the player and the player;

the applying, in a physical-beyond manner, a movement state of an object in the real environment corresponding to the edge point to the virtual object and creating corresponding function effect comprises: twisting, shortening the virtual object by using an object in the real environment.

Figure 2:
FIG. 2 is schematic diagram of an interaction between a hand in a real environment and a mouse in a virtual content.

In the embodiments of the disclosure, a movement state of an object in the real environment corresponding to the edge point can be applied in a physical manner to the virtual object and a corresponding function effect can be created. For example, in a scene of interaction between virtuality and reality shown in FIG. 2, a hand is an object in the real environment, and a mouse is a virtual object in the virtual content. The movements of the hand such as clash, press button, scroll and so forth in the real environment can be captured by a camera, and the movements of the hand in the real environment can be applied to the mouse which is a virtual object via simulating real physical law and create corresponding operations like press input, scroll input and so forth.

Figure 3:
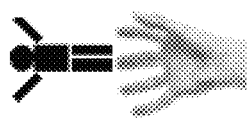
FIG. 3 is schematic diagram of an interaction between a hand in a real environment and a person in a virtual content.
Figure 4:
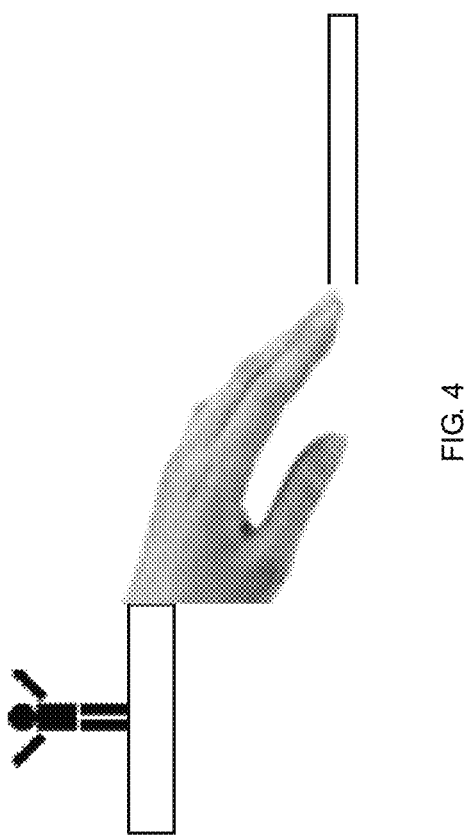
FIG. 4 is schematic diagram of an interaction between a hand in a real environment, and a person and a road in a virtual content.

In the embodiments of the disclosure, taking electronic game interaction as an example, as shown in FIG. 3, a hand is an object in the real environment, and a person is a virtual object in the game. The person in the virtual content can be fell on the hand or can be skipped, on the hand. As shown in FIG. 4, a hand is an object in the real environment, and a person and a road are virtual objects in the game. In an adventure game, the virtual person can be pass gully and obstacles with the help of the hand of a player. The player can also use his hand as a defense tool to resist arrows fired by enemies, or the player can use tools such as sticks and marbles in the real environment to attack enemies. The player can also draw any game scene with a paper and a pen to simulate physics games, and the virtual object can move in the set game scene and interact with the painting. The player can also conduct an interaction with the virtual object with his hand or any other object in the real environment.

Figure 5:
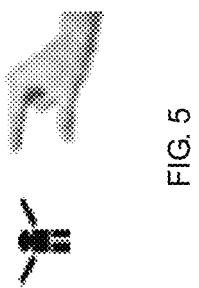
FIG. 5 is schematic diagram of an interaction based on a physical-beyond manner between a hand in a real environment and a person in a virtual content.

In the embodiments of the disclosure, a movement state of an object in the real environment corresponding to the edge point can be applied in a physical-beyond manner to the virtual object and a corresponding function effect is created. Taking electronic games as an example as shown in FIG. 5, a hand is an object in the real environment, and a person (character) is a virtual object in the game. The person in the virtual content can be shortened with the player's hand to pass through the tunnel, and the virtual character can be placed on the hand to waggle or can be twisted in a physical-beyond manner, so as to promote the emotion of the character to improve fighting capacity.

In the embodiments of the disclosure, on the basis of augmented reality based superimposed display, objects in the real environment can be used directly to apply function to virtual objects in the virtual content in a manner which is the same, similar as physical effect or beyond physical effect, so as to achieve the real interaction mechanism and experience which combine virtuality and reality.

In the embodiments of the disclosure, functions from irrelevant objects in the real environment can be excluded according to design requirements of virtual content, such as requirement of game design, and only functions from specified objects (a player's hand, whole body or any other part of the player) can be applied to virtual objects. In summary, any object in the real environment, whether stationary and movable object, can apply function to the virtual objects to achieve an experience combining virtuality and reality seamlessly without any prior knowledge of objects in the real environment.

In a specific implementation of the above method incorporating real environment for virtuality and reality combined interaction, alternatively, the applying corresponding function on the virtual object according to the movement state of the edge point comprises:

when the edge point is existed on the periphery of the virtual object, applying, based on the movement status of the edge point and preset rules in the virtual content, and in combination of the state of the virtual object, a movement state of an object in the real environment corresponding to the edge point to the virtual object and create corresponding function effect.

In the embodiments of the disclosure, not only a corresponding function can be applied to the virtual object through simulating real physical law based on movements of the edge point, but also the movement state of the edge point can be applied to the virtual object according to preset rules in the virtual content.

In a specific implementation of the above method incorporating real environment for virtuality and reality combined interaction, alternatively, the displaying the virtual content and the real environment in a superimposed manner according to function effect of the edge point to the virtual object comprises:

superimposing and completely displaying the virtual content and the real environment according to function effect of the edge point to the virtual object; or superimposing and displaying the virtual content and some areas of the real environment according to preset attributes in the virtual content; or displaying the real environment merely on some areas of the screen or virtual scene according to preset attributes in the virtual content.

In the embodiments of the disclosure, the real environment captured by a camera and the virtual content can be superimposed and completely displayed in the whole screen, and some areas extracted from real environment image and the virtual content can be superimposed and displayed. Taking electronic game interaction as an example, the real environment image can be displayed in a portion of the screen or virtual scene(such as, game scene), for example, top left corner, top right corner, bottom left corner of the screen, or an area corresponding to a game character.

Embodiment 2

Specific embodiments of a system incorporating real environment for virtuality and reality combined interaction, are also provided in the disclosure. Since the system incorporating real environment for virtuality and reality combined interaction corresponds the method incorporating real environment for virtuality and reality combined interaction, the system incorporating real environment for virtuality and reality combined interaction can achieve the objective of the disclosure by performing steps in the process of the method incorporating real environment for virtuality and reality combined interaction. Thus, the explanation in the method incorporating real environment for virtuality and reality combined interaction can also suitable for specific embodiments of the system incorporating real environment for virtuality and reality combined interaction, and will not be detailed any more in the following embodiments.

A system incorporating real environment for virtuality and reality combined interaction, is also provided in the disclosure, the system including:

a movement determining unit for edge point, configured to capture a frame of image in a real environment, and determine a movement state between a previous frame of image and a current image for at least one edge point in the image;

a functioning unit, configured to detect, for each of virtual objects in the virtual content, whether the edge point is existed on the periphery of the virtual object, and apply corresponding function on the virtual object according to the movement state of the edge point when the edge point is existed on the periphery of the virtual object; and a display unit, configured to display the vi al content and the real environment in a superimposed manner according to function effect of the edge point to the virtual object, and return back to the movement determining unit for edge point to proceed until interaction between virtuality and reality is end.

In the system incorporating real environment for virtuality and reality combined interaction, provided in an embodiment of the disclosure, by means of capturing frame images repeatedly in a real environment, determining a movement state between a previous frame of image and a current image for at least one edge point in the image, applying corresponding function on the virtual object of the virtual content according to the movement state of the edge point, and finally displaying the virtual content and the real environment in a superimposed manner according to function effect of the edge point to the virtual object, any object in the real environment can apply corresponding function on the virtual object to achieve a real interaction mechanism and experience combining virtuality and reality. Different from some prior augmented reality technique that requires identifying and tracking particular signs, the present disclosure has no need for priori knowledge of objects in the real environment.

In a specific implementation of the above system incorporating real environment for virtuality and reality combined interaction, alternatively, the movement determining unit for edge point comprises:

capturing module, configured to capture a frame of image in a real environment via a camera device;

detecting module, configured td perform edge detection for the image to determine edge points of the image, the edge points corresponding to contour of objects in the real environment;

movement determining module for edge point, configured to determine, in combination of a previous frame of captured image, a movement state between a previous frame of image and a current image for each of the detected edge points.

In a specific implementation of the above system incorporating real environment for virtuality and reality combined interaction, alternatively, the detecting module comprises:

a division sub-module, configured to perform a division for the captured image according to at least one preset attribute to extract a picture corresponding to the preset attribute, the preset attribute comprising objects in the real environment specified for interacting with the virtual content and/or movement state of the objects, the objects in the real environment comprising living things and non-living things in the nature; and a detecting sub-module, configured to perform edge detection for the extracted picture to determine edge points of the image.

In a specific implementation of the above system incorporating real environment for virtuality and reality combined interaction, alternatively, the movement determining module for edge point is further configured to:

determine, for each of the detected edge points, in combination of a previous frame of captured image, a movement state between a previous frame of image and a current image of a point of an object in the real environment corresponding to the edge point.

In a specific implementation of the above system incorporating real environment for virtuality and reality combined interaction, alternatively, the functioning unit comprises:

an edge point determining module, configured to, detect, for each of virtual objects in the virtual content, whether the edge point is existed on the periphery of the virtual object, according to a display manner of superimposition; and a first functioning module, configured to, simulate, when the edge point is existed on the periphery of the virtual object, real physical law based on the movement status of the edge point, and apply, in combination of the state of the virtual object, a movement state of an object in the real environment corresponding to the edge point to the virtual object and create corresponding function effect, the state of the virtual object comprising virtual attribute set for the virtual object in virtual content.

In a specific implementation of the above system incorporating real environment for virtuality and reality combined interaction, alternatively, the first functioning module comprises:

a first functioning sub-module, configured to apply, in a physical manner, a movement state of an object in the real environment corresponding to the edge point to the virtual object and create corresponding function effect; or a second functioning sub-module, configured to apply, in a physical-beyond manner, a movement state>of an object in the real environment corresponding to the edge point to the virtual object and create corresponding function effect;

the first functioning sub-module is further configured to:

crash and impact the virtual object using an object in the real environment via simulating real physical law; or help the virtual object pass obstacles by using an object in the real environment as attack tool, defense tool or guide tool; or move the virtual object in the scene set by a player, and interacting with the scene set by the player and the player;

the second functioning sub-module is further configured to: twist, shorten the virtual object using an object in the real environment.

In a specific implementation of the above system incorporating real environment for virtuality and reality combined interaction, alternatively, the functioning unit further comprises:

a second functioning module, configured to apply, when the edge point is existed on the periphery of the virtual object, based on the movement status of the edge point and preset rules in the virtual content, and in combination of the state of the virtual object, a movement state of an object in the real environment corresponding to the edge point to the virtual object and create corresponding function effect.

In a specific implementation of the above system incorporating real environment for virtuality and reality combined interaction, alternatively, the display unit comprises:

a first display module, configured to superimpose and completely display the virtual content and the real environment according to function effect of the edge point to the virtual object; or a second display module, configured to superimpose and display the virtual content and some areas of the real environment according to preset attributes in the virtual content; or a third display module, configured to display the real environment merely on some areas of the screen or virtual scene according, to preset attributes in the virtual content.

Described above are merely preferred embodiments of the present disclosure. It is noted that for those skilled in the art, any modification and improvement can be made without departing from the principle of the present disclosure, and these modification and improvement should fall within the protection scope of the present disclosure.

What is claimed is:

1. A method incorporating real environment for virtuality and reality combined interaction, the method being executed by a computer having a camera device and a screen, or by a processor connecting to a camera device and a screen; the method comprising:

step 1: capturing, by the camera device, a frame of image in a real environment, and determining a movement state between a previous frame of image and a current image for at least one edge point in the image;

step 2: for each of virtual objects in a virtual content, detecting, via the computer or processor, whether the edge point is existed on the periphery of the virtual object, and applying corresponding function on the virtual object according to the movement state of the edge point when the edge point is existed on the periphery of the virtual object; and step 3: displaying, by the screen, the virtual content and the real environment in a superimposed manner according to function effect of the edge point to the virtual object, and returning back to step 1 to proceed until interaction between virtuality and reality is end.

2. The method according to claim 1, wherein the capturing a frame of image in a real environment, and determining a movement state between a previous frame of image and a current image for at least one edge point in the image comprises:

capturing a frame of image in a real environment via the camera device;

performing, via the computer or the processor, edge detection for the image to determine edge points of the image, the edge points corresponding to contour of objects in the real environment;

determining, via the computer or the processor, in combination of a previous frame of captured image, a movement state between a previous frame of image and a current image for each of the detected edge points.

3. The method according to claim 2, wherein, the performing edge detection for the image to determine edge points of the image comprises:

performing, via the computer or the processor, a division for the captured image according to at least one preset attribute to extract a picture corresponding to the preset attribute, the preset attribute comprising objects in the real environment specified for interacting with the virtual content and/or movement state of the objects, the objects in the real environment comprising all of living things and non-living things in the nature, and performing, via the computer or the processor, edge detection for the extracted picture to determine edge points of the image.

4. The method according to claim 2, wherein, the determining, in combination of a previous frame of captured image, a movement state between a previous frame of image and a current image for each of the detected edge points comprises:

for each of the detected edge points, determining, via the computer or the processor, in combination of a previous frame of captured image, a movement state between a previous frame of image and a current image of a point of an object in the real environment corresponding to the edge point.

5. The method according to claim 1, wherein, for each of virtual objects in the virtual content, the detecting whether the edge point is existed on the periphery of the virtual object, and applying corresponding function on the virtual object according to the movement state of the edge point when the edge point is existed on the periphery of the virtual object comprises:

detecting, via the computer or the processor, for each of virtual objects in the virtual content, whether the edge point is existed on the periphery of the virtual object, according to a display manner of superimposition; and when the edge point is existed on the periphery of the virtual object, simulating, via the computer or the processor, real physical law based on the movement status of the edge point, and applying, via the computer or the processor, in combination of the state of the virtual object a movement state of an object in the real environment corresponding to the edge point to the virtual object and create corresponding function effect, the state of the virtual object comprising virtual attribute which is set for the virtual object in virtual content.

6. The method according to claim 5, wherein, the applying a movement state of an object in the real environment corresponding to the edge point to the virtual object and creating corresponding function effect comprises:

applying, via the computer or the processor, in a physical manner, a movement state of an object in the real environment corresponding to the edge point to the virtual object and create corresponding function effect; or applying, via the computer or the processor, in a physical beyond manner, a movement state of art object in the real environment corresponding to the edge point to the virtual object and create corresponding function effect:

the applying, in a physical manner, a movement state of an object in the real environment corresponding to the edge point to the virtual object and creating corresponding function effect comprises:

crashing and impacting, via the computer or the processor, the virtual object using an object in the real environment via simulating real physical law; or helping, via the computer or the processor, the virtual object pass obstacles by using n object in the real environment as attack tool, defense tool or guide tool; or moving, via the computer or the processor, the virtual object in the scene set by a player, and interacting with the scene set by the player and the player;

the applying, in a physical-beyond manner, a movement state of an object in the real environment corresponding to the edge point to the virtual object and creating corresponding function effect comprises: twisting, shortening the virtual object by using an object in the real environment.

7. The method according to claim 1, wherein, the applying co responding function on the virtual object according to the movement state of the edge point comprises:

when the edge point is existed on the periphery of the virtual object, applying, via the computer or the processor, based on the movement status of the edge point and preset rules in the virtual content, and in combination of the state of the virtual object, a movement state of an object in the real environment corresponding to the edge point to the virtual object and create corresponding function effect.

8. The method according to claim 1, wherein, the displaying the virtual content and the real environment in a superimposed manner according to function effect of the edge point to the virtual object comprises:

superimposing, via the computer or the processor, and completely displaying, via the screen, the virtual content and the real environment according to function effect of the edge point to the virtual object; or superimposing, via the computer or the processor, and displaying, via the screen, the virtual content and some areas of the real environment according to preset attributes in the virtual content; or displaying the real environment merely on some areas of the screen or virtual scene according to preset attributes in the virtual content.

9. A system incorporating real environment for virtuality and reality combined interaction, the system comprises a computer having a camera device and a screen or a processor connecting to a camera device and a screen, the system is configured to capture, by a camera device, a frame of image in a real environment, and determine, by the computer or the processor, a movement state between a previous frame of image and a current image for at least one edge point in the image;

to detect, by the computer or the processor, for each of virtual objects in the virtual content, whether the edge point is existed on the periphery of the virtual object, and apply corresponding function on the virtual object according to the movement state of the edge point when the edge point is existed on the periphery of the virtual object; and display, by the screen, a virtual content and the real environment in a superimposed manner according to function effect of the edge point to the virtual object, and return back to the movement determining unit for edge point to proceed until interaction between virtuality and reality is end.

10. The system according to claim 9, wherein the system is further configured to capture a frame of image in a real environment via the camera device;

perform, by the computer or the processor, edge detection for the image to determine edge points of the image, the edge points corresponding to contour of objects in the real environment;

determine, by the computer or the processor, in combination of a previous frame of captured image, a movement state between a previous frame of image and a current image for each of the detected edge points.

11. The system according to claim 10, wherein the system is further configured to perform, by the computer or the processor, a division for the captured image according to at least one preset attribute to extract a picture corresponding to the preset attribute, the preset attribute comprising objects in the real environment specified for interacting with the virtual content and/or movement state of the objects, the objects in the real environment comprising all of living things and non-living things in the nature; and perform, by the computer or the processor, edge detection for the extracted picture to determine edge points of the image.

12. The system according to claim 10, wherein, the system is further configured to:

determine, by the computer or the processor, for each of the detected edge points, in combination of a previous frame of captured image, a movement state between a previous frame of image and a current image of a point of an object in the real environment corresponding to the edge point.

13. The system according to claim 9, wherein, the system is further configured to:

detect, by the computer or the processor, for each of virtual objects in the virtual content, whether the edge point is existed on the periphery of the virtual object, according to a display manner of superimposition; and simulate, by the computer or the processor, when the edge point is existed on the periphery of the virtual object, real physical law based on the movement status of the edge point, and apply, in combination of the state of the virtual object, a movement state of an object in the real environment corresponding to the edge point to the virtual object and create corresponding function effect, the state of the virtual object comprising virtual attribute which is set for the virtual object in virtual content.

14. The system according to claim 13, wherein the system is further configured to apply, by the computer or the processor, in a physical manner, a movement state of an object in the real environment corresponding to the edge point to the virtual object and create corresponding function effect; or apply, by the computer or the processor, in a physical-beyond manner, a movement state of an object in the real environment corresponding to the edge point to the virtual object and create corresponding function effect;

the apply, by the computer or the processor, in a physical manner, a movement state of an object in the real environment corresponding to the edge point to the virtual object and create corresponding function effect is further configured to:

crash and impact, by the computer or the processor, in a physical manner, a movement state of an object in the real environment corresponding to the edge point to the virtual object and create corresponding function effect the virtual object using an object in the real environment via simulating real physical law; or help, by the computer or the processor, the virtual object pass obstacles by using an object in the real environment as attack tool, defense tool or guide tool; or move, by the computer or the processor, the virtual object in the scene set by a player, and interacting with the scene set by the player and the player;

the apply in a physical-beyond manner, a movement state of an object in the real environment corresponding to the edge point to the virtual object and create corresponding function effect is further configured to: twist, shorten the virtual object using an object in the real environment.

15. The system according to claim 9, wherein the system is further configured to apply, by the computer or the processor, in a physical-beyond manner, a movement state of an object in the real environment corresponding to the edge point to the virtual object and create corresponding function effect when the edge point is existed on the periphery of the virtual object, based on the movement status of the edge point and preset rules in the virtual content, and in combination of the state of the virtual object, a movement state of an object in the real environment corresponding to the edge point to the virtual object and create corresponding function effect.

16. The system according to claim 9, wherein the system is further configured to superimpose, by the computer or the processor, in a physical-beyond manner, a movement state of an object in the real environment corresponding to the edge point to the virtual object and create corresponding function effect and completely display, by a screen, the virtual content and the real environment according to function effect of the edge point to the virtual object; or superimpose, by the computer or the processor, and display, by a screen, the virtual content and some areas of the real environment according to preset attributes in the virtual content, or display the real environment merely on some areas of the screen or virtual scene according to preset attributes in the virtual content.

\* \* \* \* \*